United States Patent
Mochizuki et al.

(10) Patent No.: US 9,835,900 B2
(45) Date of Patent: Dec. 5, 2017

(54) DISPLAY DEVICE

(71) Applicant: Japan Display Inc., Minato-ku (JP)

(72) Inventors: Kazuhide Mochizuki, Tokyo (JP); Hirotaka Hayashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/254,253

(22) Filed: Sep. 1, 2016

(65) Prior Publication Data

US 2017/0068129 A1    Mar. 9, 2017

(30) Foreign Application Priority Data

Sep. 7, 2015    (JP) .................... 2015-175845

(51) Int. Cl.
  *G02F 1/1343*    (2006.01)
  *G02F 1/1335*    (2006.01)
  *G02F 1/1362*    (2006.01)

(52) U.S. Cl.
  CPC .. *G02F 1/133553* (2013.01); *G02F 1/136213* (2013.01); *G02F 1/134336* (2013.01)

(58) Field of Classification Search
  CPC ......... G02F 1/133553; G02F 1/136213; G02F 1/134336
  See application file for complete search history.

(56) References Cited

U.S. PATENT DOCUMENTS

| 5,956,103 A | * | 9/1999 | Ishiguro | ............ G02F 1/136209 349/111 |
| 2009/0184946 A1 | * | 7/2009 | Ahn | .................. G02F 1/133512 345/206 |

FOREIGN PATENT DOCUMENTS

JP    2002-365664    12/2002

* cited by examiner

*Primary Examiner* — Donald Raleigh
(74) *Attorney, Agent, or Firm* — Oblon, McClelland, Maier & Neustadt, L.L.P.

(57) ABSTRACT

According to one embodiment, a display device includes a first substrate, a second substrate and a liquid crystal layer. The first substrate includes a display area including a plurality of pixels, and a light-shielding layer. Each of the pixels includes first and second pixel electrodes having have different pixel areas, a first semiconductor element, a second semiconductor element, a first capacitance electrode connected to the first semiconductor element and forming a first auxiliary capacitance, and a second capacitance electrode connected to the second semiconductor element, forming a second auxiliary capacitance, and having an electrode area different from that of the first capacitance electrode.

18 Claims, 9 Drawing Sheets

DISPLAY DEVICE

CROSS-REFERENCE TO RELATED APPLICATIONS

This application is based upon and claims the benefit of priority from Japanese Patent Application No. 2015-175845, filed Sep. 7, 2015, the entire contents of which are incorporated herein by reference.

FIELD

Embodiments described herein relate generally to a display device.

BACKGROUND

In recent years, wearable devices connectable to a network in cooperation with smartphones, etc., have become widely used. Wearable devices currently find application in watches, navigation systems, and sports and health management. In many cases, wearable devices are worn for a long time. Thus, reflective display devices are widely used for wearable devices since such display devices do not use a backlight and consume low energy.

However, as wearable devices are mainly used outdoors, the display devices are exposed to strong external light. Thus, light leakage is easily produced in the semiconductor elements included in a display device. The low-frequency operation of the display device, which reduces energy consumption, is disturbed by such light leakage. The light leakage can be eliminated by providing a metal light-shielding layer facing the semiconductor elements. However, when the metal light-shielding layer is provided, the capacitances formed between a plurality of pixel electrodes having different pixel areas and the metal light-shielding layer differ depending on the pixel electrode. As a result, the drive performance varies among the semiconductor elements. Thus, the display quality is deteriorated.

DETAILED DESCRIPTION

Various embodiments will be described hereinafter with reference to the accompanying drawings. In general, according to one embodiment, a display device comprises a first substrate, a second substrate facing the first substrate, and a liquid crystal layer provided between the first and second substrates. The first substrate comprises: a display area including a plurality of pixels; a plurality of signal lines; a plurality of capacitance lines; and a light-shielding layer which covers substantially an entire surface of the display area. Each of the pixels comprises: a first pixel electrode which faces the light-shielding layer with an insulating layer interposed; a second pixel electrode which faces the light-shielding layer with the insulating layer interposed, and has a pixel area different from a pixel area of the first pixel electrode; a first semiconductor element connected to the signal lines and the first pixel electrode; a second semiconductor element connected to the signal lines and the second pixel electrode; a first capacitance electrode which is connected to the first semiconductor element, faces the capacitance lines with an insulating layer interposed, and forms a first auxiliary capacitance; and a second capacitance electrode which is connected to the second semiconductor element, faces the capacitance lines with an insulating layer interposed, forms a second auxiliary capacitance, and has an electrode area different from an electrode area of the first capacitance electrode.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In the specification and drawings, the same elements as those described in connection with preceding drawings are denoted by like reference numbers, and detailed description thereof is omitted unless necessary.

In each embodiment described below, a liquid crystal display device is disclosed as an example of a display device. The liquid crystal display device may be used for various devices. For example, the liquid crystal display device may be used for a wearable device such as a watch or a navigation system, a smartphone, a tablet, a mobile phone, a personal computer, a television receiver, in-vehicle equipment or a game console.

First Embodiment

Figure 1:
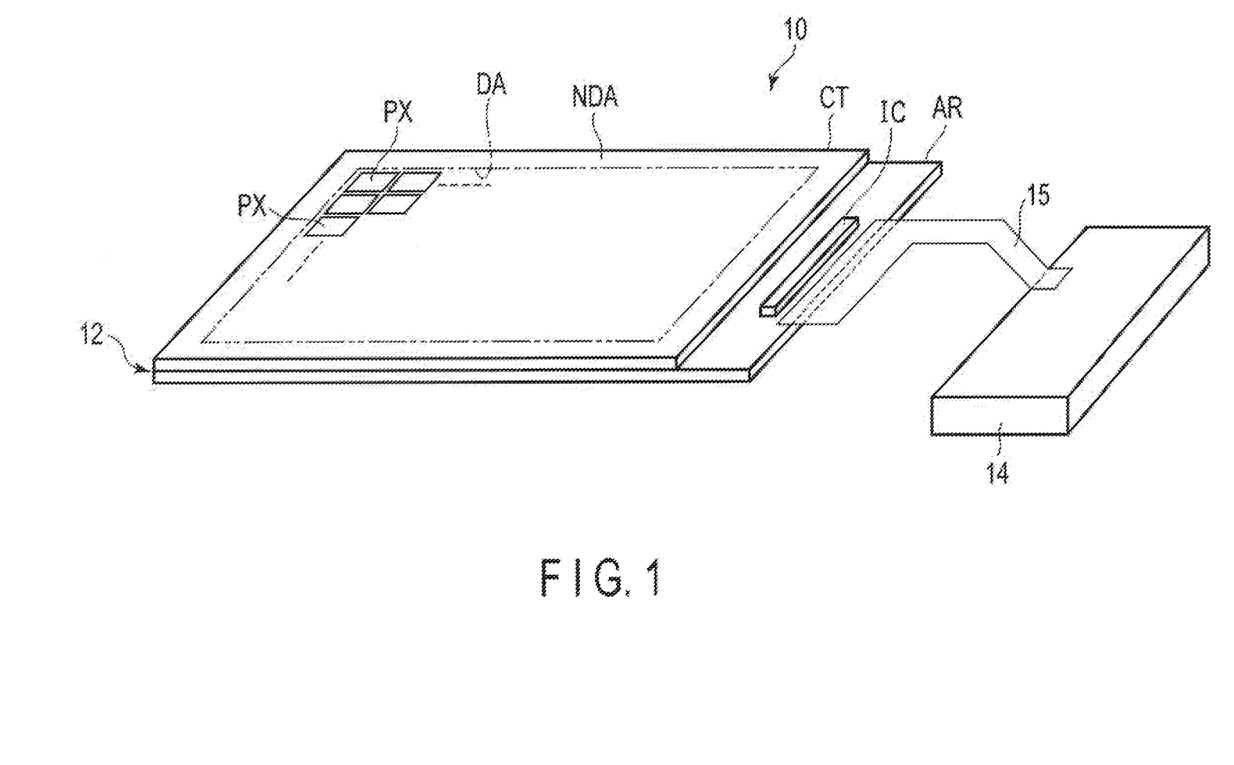
FIG. 1 is a perspective view schematically showing a liquid crystal display device according to a first embodiment.

FIG. 1 is a perspective view showing a liquid crystal display device according to a first embodiment.

The liquid crystal display device 10 comprises an active-matrix liquid crystal display panel 12, a drive IC chip IC which drives the liquid crystal display panel 12, a control module 14, a flexible wiring substrate 15, etc.

The liquid crystal display panel 12 comprises an array substrate (first substrate) AR having the shape of a flat rectangular plate, a counter-substrate (second substrate) CT facing the array substrate AR and having the shape of a flat rectangular plate, and a liquid crystal layer retained between the array substrate AR and the counter-substrate CT. The circumferential portion of the counter-substrate CT is attached to the array substrate AR by a sealing material. The liquid crystal display panel 12 comprises a rectangular display area (active area) DA which displays an image, and a non-display area NDA located around the display area DA and having the shape of a rectangular frame. The liquid crystal display panel 12 comprises a plurality of pixels (main pixels or unit pixels) PX arranged in matrix in the display area DA. The drive IC chip IC is mounted in the circumferential portion of the array substrate AR. The flexible wiring substrate 15 connects the liquid crystal display panel 12 to the control module 14.

For example, the liquid crystal display panel 12 is a reflective-type display panel having a reflective display function which displays an image by selectively reflecting the incident light from the display side, such as external light or fill light, on the pixels PX. In the reflective-type liquid crystal display panel 12, a front-light unit may be provided on a side facing the counter-substrate CT as an auxiliary light source. The liquid crystal display panel 12 may have a structure corresponding to, as a display mode, a vertical electric field mode mainly using a vertical electric field substantially perpendicular to the main surface of the substrate, or may have a structure corresponding to, as a display mode, a lateral electric field mode mainly using a lateral electric field substantially parallel to the main surface of the substrate.

For example, each pixel PX which is the minimum unit constituting a color image includes, as described later, a subpixel PR displaying red, a subpixel PG displaying green, a subpixel PB displaying blue and a subpixel PW displaying white. Each pixel PX may further include subpixels displaying other colors (for example, yellow, light blue, light red and a substantially transparent color).

Figure 2:
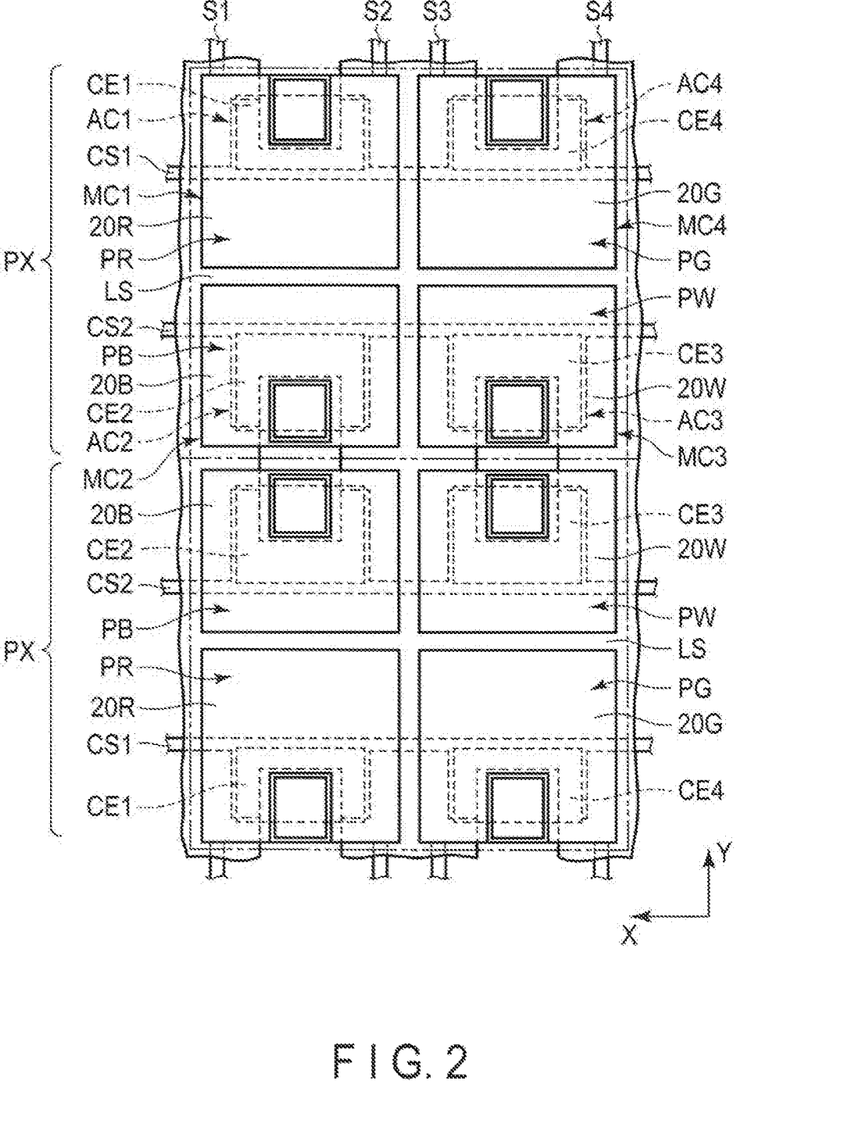
FIG. 2 is a plan view schematically showing a plurality of pixels on an array substrate in the liquid crystal display device.
Figure 3:
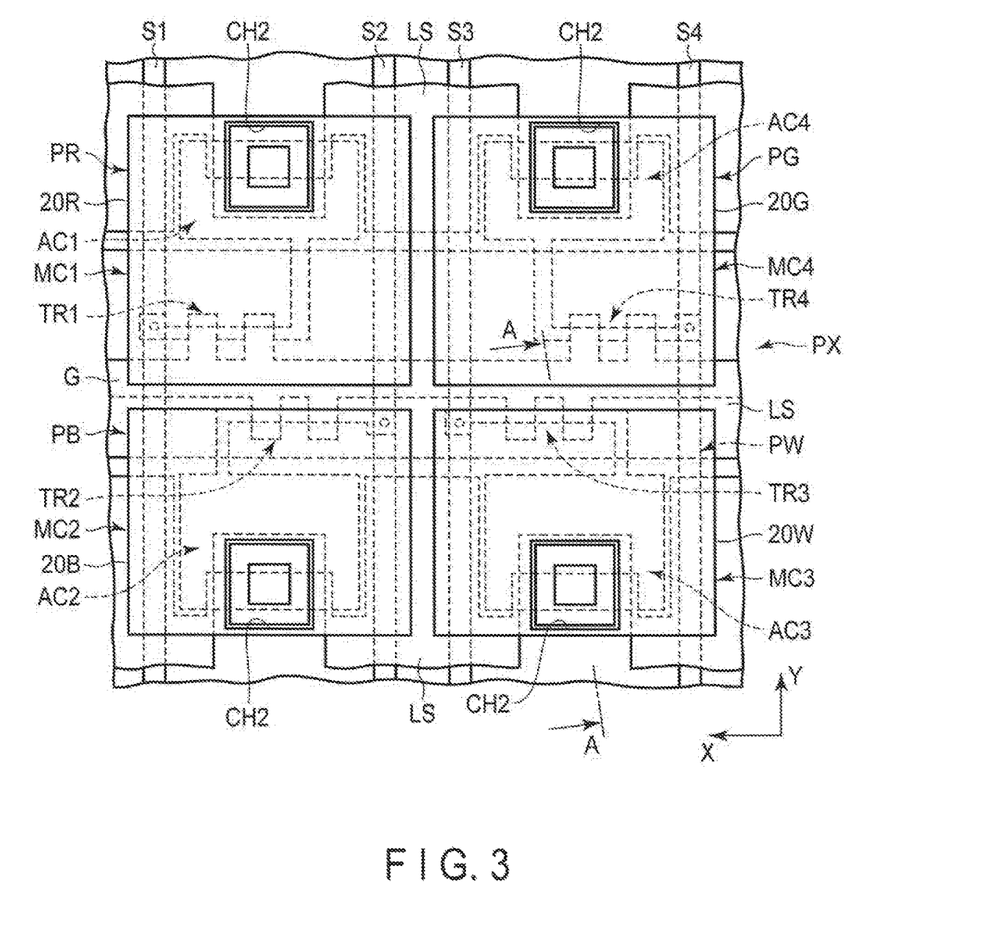
FIG. 3 is a plan view in which a pixel is enlarged.

FIG. 2 is a plan view schematically showing a plurality of pixels PX on the array substrate AR. FIG. 3 is a plan view in which a pixel is enlarged.

As shown in FIG. 2 and FIG. 3, a light-shielding layer (light-shielding film) LS is provided over substantially the entire surface of the display area DA of the array substrate AR. Each pixel PX on the array substrate AR is structured as, for example, a square irregular-shaped pixel. Each pixel PX comprises four rectangular pixel electrodes. The four pixel electrodes are a first pixel electrode (a pixel electrode for red) 20R, a second pixel electrode (a pixel electrode for blue) 20B, a third pixel electrode (a pixel electrode for white) 20W and a fourth pixel electrode (a pixel electrode for green) 20G. The first pixel electrode 20R is larger than the second pixel electrode 20B in size, and has a pixel area larger than that of the second pixel electrode 20B. The fourth pixel electrode 20G is substantially equal to the first pixel electrode 20R in size, and has a pixel area larger than that of the third pixel electrode 20W. The third pixel electrode 20W is substantially equal to the second pixel electrode 20B in size. Thus, each pixel PX comprises two large pixel electrodes 20R and 20G, and two small pixel electrodes 20B and 20W. The first pixel electrode 20R and the fourth pixel electrode 20G are arranged in a first direction (X-direction). The second pixel electrode 20B and the third pixel electrode 20W are arranged in the first direction (X-direction). The first pixel electrode 20R and the second pixel electrode 20B are arranged in a second direction (Y-direction) perpendicular to the first direction.

The first pixel electrode 20R, the second pixel electrode 20B, the third pixel electrode 20W and the fourth pixel electrode 20G face the light-shielding layer LS with an insulating layer interposed, and structure first, second, third and fourth main capacitances MC1, MC2, MC3 and MC4, respectively. The first, second, third and fourth main capacitances MC1, MC2, MC3 and MC4 correspond to the first, second, third and fourth pixel electrodes 20R, 20B, 20W and 20G, respectively, in size. Each pixel PX comprises a first capacitance line CS1 extending in the first direction X under the first pixel electrode 20R and the fourth pixel electrode 20G, a second capacitance line CS2 extending in the first direction X under the second pixel electrode 20B and the third pixel electrode 20W, and first, second, third and fourth capacitance electrodes CE1, CE2, CE3 and CE4.

In an area facing the first pixel electrode 20R, the first capacitance electrode CE1 is provided in a part of the first capacitance line CS1 so as to face the first pixel electrode 20R with an insulating layer interposed, and structures a first auxiliary capacitance AC1. In an area facing the fourth pixel electrode 20G, the fourth capacitance electrode CE4 is provided in a part of the first capacitance line CS1 so as to face the fourth pixel electrode 20G with an insulating layer interposed, and structures a fourth auxiliary capacitance AC4. In an area facing the second pixel electrode 20B, the second capacitance electrode CE2 is provided in a part of the second capacitance line CS2 so as to face the second pixel electrode 20B with an insulating layer interposed, and structures a second auxiliary capacitance AC2. In an area facing the third pixel electrode 20W, the third capacitance electrode CE3 is provided in a part of the second capacitance line CS2 so as to face the third pixel electrode 20W with an insulating layer interposed, and structures a third auxiliary capacitance AC3.

The first capacitance electrode CE1 is substantially equal to the fourth capacitance electrode CE4 in size. The first capacitance electrode CE1 and the fourth capacitance electrode CE4 are smaller than the second capacitance electrode CE2 in size, and have an electrode area smaller than that of the second capacitance electrode CE2. The second capacitance electrode CE2 is substantially equal to the third capacitance electrode CE3 in size. The second capacitance electrode CE2 and the third capacitance electrode CE3 are larger than the first capacitance electrode CE1 in size. In this manner, the first auxiliary capacitance AC1 and the fourth auxiliary capacitance AC4 have capacitances less than those of the second auxiliary capacitance AC2 and the third auxiliary capacitance AC3, respectively.

The size of each electrode is set such that the total capacitance of the first auxiliary capacitance AC1 and the first main capacitance MC1 which is formed by the first pixel electrode 20R having a large pixel area is substantially equal to the total capacitance of the second auxiliary capacitance AC2 and the second main capacitance MC2 which is formed by the second pixel electrode 20B having a small pixel area. Thus, the total capacitance of the main capacitance and the auxiliary capacitance is the same among the four pixel electrodes.

Now, this specification more specifically explains the array substrate AR and the counter-substrate CT.

Figure 4:
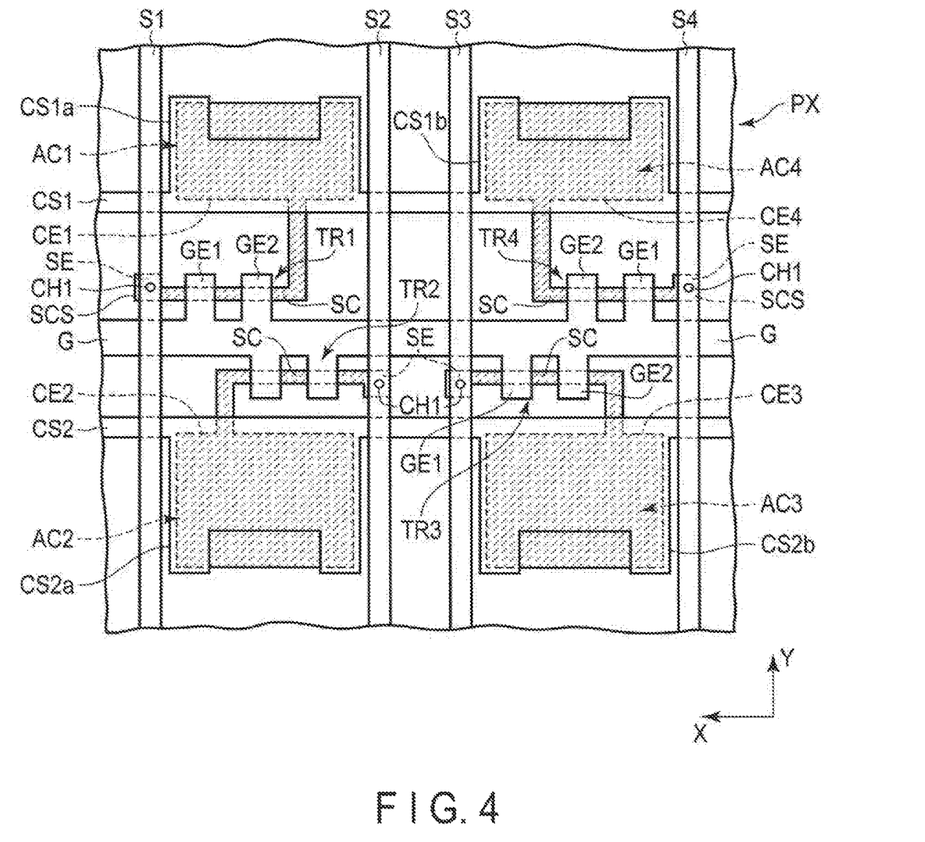
FIG. 4 is a plan view in which a pixel is enlarged in a state where pixel electrodes and a light-shielding layer are omitted.
Figure 5:
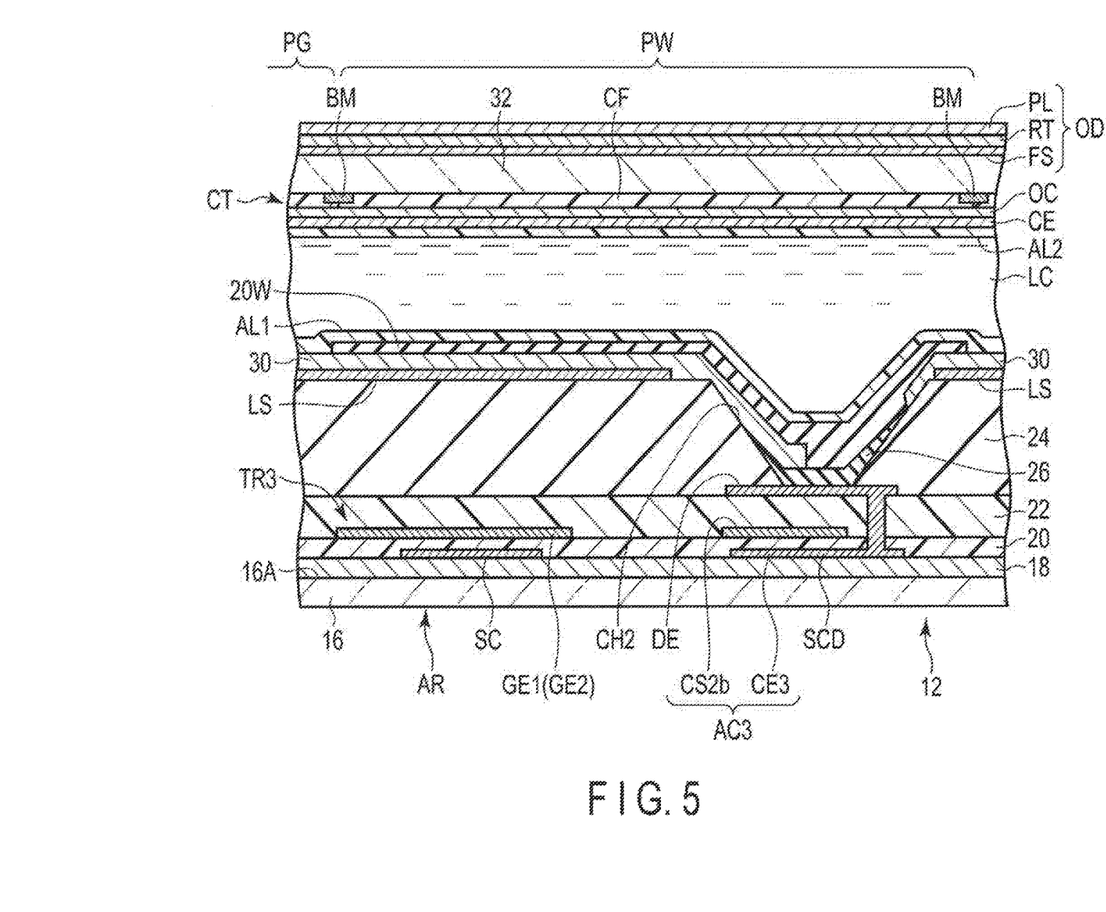
FIG. 5 is a cross-sectional view of a liquid crystal display panel along line A-A of FIG. 4.

FIG. 4 is a plan view in which a pixel is enlarged in a state where the pixel electrodes and the light-shielding layer are omitted. FIG. 5 is a cross-sectional view of the liquid crystal display panel along line A-A of FIG. 3.

As shown in FIG. 5, the liquid crystal display panel 12 comprises the array substrate AR, the counter-substrate CT facing the array substrate, and the liquid crystal layer LC encapsulated between the array substrate AR and the counter-substrate CT.

As shown in FIG. 4 and FIG. 5, the array substrate AR is formed by an insulating substrate 16 having a phototransmissive property, such as a glass substrate or resin substrate. On the insulating substrate 16, the array substrate AR comprises the pixel electrodes, thin-film transistors (semiconductor elements) TR and storage capacitances for each pixel, and further comprises a gate line drive circuit and a signal line drive circuit.

The insulating substrate 16 comprises an inner surface 16A covered by a first insulating layer (undercoat layer) 18. The first insulating layer 18 is formed of, for example, a silicon oxide (SiOx) or a silicon oxynitride (SiONy).

In the present embodiment, four thin-film transistors (semiconductor elements) TR1 to TR4 are provided for each pixel. Each thin-film transistor comprises a semiconductor layer SC provided on the first insulating layer 18, gate electrodes GE1 and GE2 provided over the semiconductor layer SC with a second insulating layer 20 interposed, and source and drain electrodes SE and DE provided on a third insulating layer 22 covering the gate electrodes GE1 and GE2. Each thin-film transistor is a top-gate transistor. Each of the thin-film transistors TR1 to TR4 is a double-gate transistor comprising two gate electrodes.

The semiconductor layer SC formed of, for example, low-temperature polysilicon, is provided on the first insulating layer 18. The semiconductor layer SC is patterned into a slender rectangle (linearly). The semiconductor layer SC comprises two channel areas, a low-concentration impurity area which is located between the two channel areas and is doped with phosphorous as impurities, and source and drain areas SCS and SCD which are located on both sides of the channel areas and are doped with, for example, phosphorous. The resistance of the source and drain areas SCS and SCD is less than that of the channel areas.

The drain area SCD of each semiconductor layer SC is rectangular, having a predetermined size. The drain areas SCD structure the first, second, third and fourth capacitance electrodes CE1, CE2, CE3 and CE4.

The second insulating layer (gate insulating layer) 20 is provided on the semiconductor layer SC and covers the semiconductor layer SC. The gate electrodes GE1 and GE2 included in the thin-film transistors TR1 to TR4 are provided on the second insulating layer 20 and face the channel areas of the semiconductor layer SC. The gate electrodes GE1 and GE2 are formed of an interconnect material, for example, a metal material such as molybdenum, tungsten, aluminum or titanium, or an alloy including these metal materials. The gate electrodes GE1 and GE2 are electrically connected to, for example, a gate line G provided in the same layer as the gate electrodes, or are formed integrally with the gate line G. In the present embodiment, the gate line G is provided on the second insulating layer 20, and extends in the first direction X, passing through substantially the central portion of each pixel PX.

A plurality of first capacitance lines CS1 and a plurality of second capacitance lines SC2 are provided on the second insulating layer 20, and extend in the first direction X parallel to each other. The first and second capacitance lines CS1 and CS2 extend in each pixel PX, and are located on both sides of the gate line G. The first and second capacitance lines CS1 and CS2 are formed of, for example, a metal material such as molybdenum, tungsten, aluminum or titanium, or an alloy including these metal materials.

In each first capacitance line CS1, a plurality of portions are wide, and structure capacitance electrodes CS1*a* and CS1*b*. The capacitance electrodes CS1*a* and CS1*b* are rectangular, having sizes corresponding to those of the first and fourth capacitance electrodes CE1 and CE4, respectively. The capacitance electrodes CS1*a* and CS1*b* face the first and fourth capacitance electrodes CE1 and CE4, respectively, with the second insulating layer 20 interposed. These capacitance electrodes form the first MIM auxiliary capacitance AC1 and the fourth MIM auxiliary capacitance AC4.

The first and fourth auxiliary capacitances AC1 and AC4 are connected to the drains of the thin-film transistors TR1 and TR4, respectively.

In each second capacitance line CS2, a plurality of portions are wide, and structure capacitance electrodes CS2*a* and CS2*b*. The capacitance electrodes CS2*a* and CS2*b* are rectangular, having sizes corresponding to those of the second and third capacitance electrodes CE2 and CE3, respectively. The capacitance electrodes CS2*a* and CS2*b* face the second and third capacitance electrodes CE2 and CE3, respectively, with the second insulating layer 20 interposed. These capacitance electrodes form the second MIM auxiliary capacitance AC2 and the third MIM auxiliary capacitance AC3. The second and third auxiliary capacitances AC2 and AC3 are connected to the drains of the thin-film transistors TR2 and TR3, respectively.

The gate line G including the gate electrodes GE1 and GE2, the first and second capacitance lines CS1 and CS2, and the second insulating layer 20 are covered by the third insulating layer 22. As the material of the third insulating layer 22, for example, a silicon oxide (SiOx) or a silicon oxynitride (SiONy) may be employed.

The source and drain electrodes SE and DE included in each thin-film transistor TR are provided on the third insulating layer 22. Four signal lines, specifically, first to fourth signal lines S1 to S4, are provided for each pixel PX on the third insulating layer 22, and extend in the second direction Y. The source electrode SE of the thin-film transistor TR1 is in contact with the source area SCS of the semiconductor layer SC via a contact hole CH1 penetrating the third insulating layer 22. The source electrode SE is connected to the first signal line S1 or is formed integrally with the first signal line S1.

Similarly, the source electrodes SE of the thin-film transistors TR2, TR3 and TR4 are formed integrally with the second, third and fourth signal lines S2, S3 and S4, respectively, and are in contact with the respective source areas SCS of the semiconductor layer SC via the respective contact holes CH1.

The source and drain electrodes SE and DE and the signal lines may be formed of the same interconnect material.

As shown in FIG. 3 and FIG. 5, the first to fourth signal lines S1 to S4 and the source and drain electrodes SE and DE are covered by a fourth insulating layer (organic insulating film) 24. As the material of the fourth insulating layer 24, for example, a silicon oxide (SiOx) or a silicon oxynitride (SiONy) may be employed. In the fourth insulating layer 24, a contact hole CH2 is provided in a portion facing a corresponding drain electrode DE and communicates with the drain electrode DE.

The light-shielding layer LS is provided over substantially the entire surface of the fourth insulating layer 24. The light-shielding layer LS is formed of a conductive light-shielding material, for example, a metal material such as molybdenum, tungsten, aluminum or titanium, or an alloy including these metal materials. The light-shielding layer LS covers the entire array substrate AR excluding the contact holes CH2, and completely covers the four thin-film transistors TR1 to TR4 as a matter of course.

A contact protective layer 26 is provided in the bottom portion of each contact hole CH2 and is connected to the drain electrode DE. As the contact protective layer 26, for example, indium-tin-oxide (ITO) may be employed.

A fifth insulating layer (interlayer insulating film) 30 is provided on the fourth insulating layer 24 so as to be stacked on the light-shielding layer LS and the contact holes CH2.

As the material of the fifth insulating layer 30, for example, a silicon oxide (SiOx) or a silicon oxynitride (SiONy) may be employed.

The first pixel electrode 20R, the second pixel electrode 20B, the third pixel electrode 20W and the fourth pixel electrode 20G are provided on the fifth insulating layer 30. Each pixel electrode is connected to the drain electrode DE of a corresponding one of the thin-film transistors TR1 to TR4 via the contact hole CH2 and the contact protective layer 26. The first, second, third and fourth pixel electrodes 20R, 20B, 20W and 20G face the light-shielding layer LS with the fifth insulating layer 30 interposed, and structure the first, second, third and fourth main capacitances MC1, MC2, MC3 and MC4 having sizes corresponding to those of the pixel electrodes, respectively.

On the fifth insulating layer 30, each of the first, second, third and fourth pixel electrodes 20R, 20B, 20W and 20G includes a reflective layer formed of a metal material having a light reflective property, such as aluminum or silver. Each pixel electrode comprises a substantially flat surface (mirror surface). A transparent electrode formed of, for example, ITO, may be further provided on each pixel electrode. These pixel electrodes are covered by an alignment film AL1.

As shown in FIG. 5, the counter-substrate CT comprises, for example, a second insulating substrate 32, a light-shielding layer BM, a color filter CF, an overcoat layer OC, a common electrode CE and a second alignment film AL2. The light-shielding layer BM is provided on a side of the second insulating substrate 32 so as to face the array substrate AR. The color filter CF is provided on a side of the second insulating substrate 32 so as to face the array substrate AR, and partially overlaps the light-shielding layer BM. The color filter CF includes a red filter facing the first pixel electrode 20R, a blue filter facing the second pixel electrode 20G, a white filter facing the third pixel electrode 20W and a green filter facing the fourth pixel electrode 20G. In this manner, each pixel PX which is the minimum unit constituting a color image includes a subpixel PR displaying red, a subpixel PG displaying green, a subpixel PB displaying blue and a subpixel PW displaying white.

When each pixel PX further includes a subpixel displaying another color, a color filter corresponding to the color is provided in the subpixel. As a color filter corresponding to a color different from red, green and blue, for example, a color filter corresponding to yellow, light blue or light red may be included. These color filters CF are provided corresponding to the subpixels displaying the respective colors.

The overcoat layer OC covers the color filter CF. The common electrode CE is provided on a side of the overcoat layer OC so as to face the array substrate AR. The common electrode CE is provided over the entire area of each pixel PX and faces the first to fourth pixel electrodes 20R, 20B, 20W and 20G. The common electrode CE is formed of a transparent conductive material such as indium-tin-oxide (ITO) or indium-zinc-oxide (IZO). The second alignment film AL2 covers the common electrode CE.

The array substrate AR is attached to the counter-substrate CT such that the first alignment film AL1 faces the second alignment film AL2. The liquid crystal layer LC is retained between the array substrate AR and the counter-substrate CT, and contains liquid crystal molecules located between the first alignment film AL1 and the second alignment film AL2.

An optical element OD is provided on a side (an external side) of the counter-substrate CT so as to be opposite to the contact side with the liquid crystal layer LC. The optical element OD comprises, for example, a front scattering film FS, a retardation film RT and a polarizer PL. The front scattering film FS is attached to, for example, the second insulating substrate 32. The front scattering film FS has a function for transmitting incident light from a specific direction (from an external light source side) and diffusing incident light from other specific directions. As the front scattering film FS, a plurality of layers are preferably stacked in order to expand the diffusion range and prevent iridescent color. The retardation film RT is stacked on the front scattering film FS. The retardation film RT is a quarter-wave film. For example, the retardation film RT is structured by stacking a quarter-wave film and a half-wave film. The retardation film RT is structured so as to reduce the wavelength dependency and obtain a desired retardation in the wavelength range used for color display. The polarizer PL is stacked on the retardation film RT. The position of the front scattering film FS is not limited to the position shown in the figure. The front scattering film FS may be stacked on the polarizer PL.

In the liquid crystal display device 10 having the above structures, the signal line drive circuit and the gate line drive circuit intermittently drive the display pixels PX with a low frequency of approximately 60 Hz. When an image is displayed, external light enters the pixel electrodes after passing through the optical element OD, the counter-substrate CT, the color filter CF and the liquid crystal layer LC. After the light is reflected on the pixel electrodes, the light passes through the liquid crystal layer LC, the color filter CF, the counter-substrate CT and the optical element OD again. Subsequently, the light is emitted to outside. In this manner, a color image is displayed.

In the liquid crystal display device 10, the light-shielding layer LS is provided over substantially the entire surface of the array substrate AR. Thus, external light does not enter the thin-film transistors TR, and it is possible to surely prevent light leakage. The first to fourth electrodes 20R to 20G included in each pixel PX have sizes and shapes different from each other, and form the main capacitances MC1 to MC4 having sizes different from each other between the first to fourth electrodes 20R to 20G and the light-shielding layer LS. In addition, the MIM auxiliary capacitances AC1 to AC4 having sizes different from each other are provided in order to eliminate the variation in the main capacitances and equalize the capacitances. The auxiliary capacitances are set such that the sum of the main capacitance and the auxiliary capacitance is the same among a plurality of subpixels. In this manner, it is possible to eliminate the variation in field-through voltages caused by a plurality of thin-film transistors TR and equalize the voltages. Thus, light leakage can be prevented. At the same time, the variation in the drive performance of the semiconductor elements can be removed. It is possible to obtain a liquid crystal display device having good display quality. Further, the main capacitances produced between the pixel electrodes and the shielding layer can be effectively used. It is possible to change the size of each pixel to a size most suitable for the optical property.

This specification looks at liquid crystal display devices according to other embodiments. In the description of these alternative embodiments to follow, like reference numbers are used to designate the same elements as the first embodiment, detailed description thereof being omitted. Elements different from those of the first embodiment are mainly explained in detail.

Second Embodiment

Figure 6:
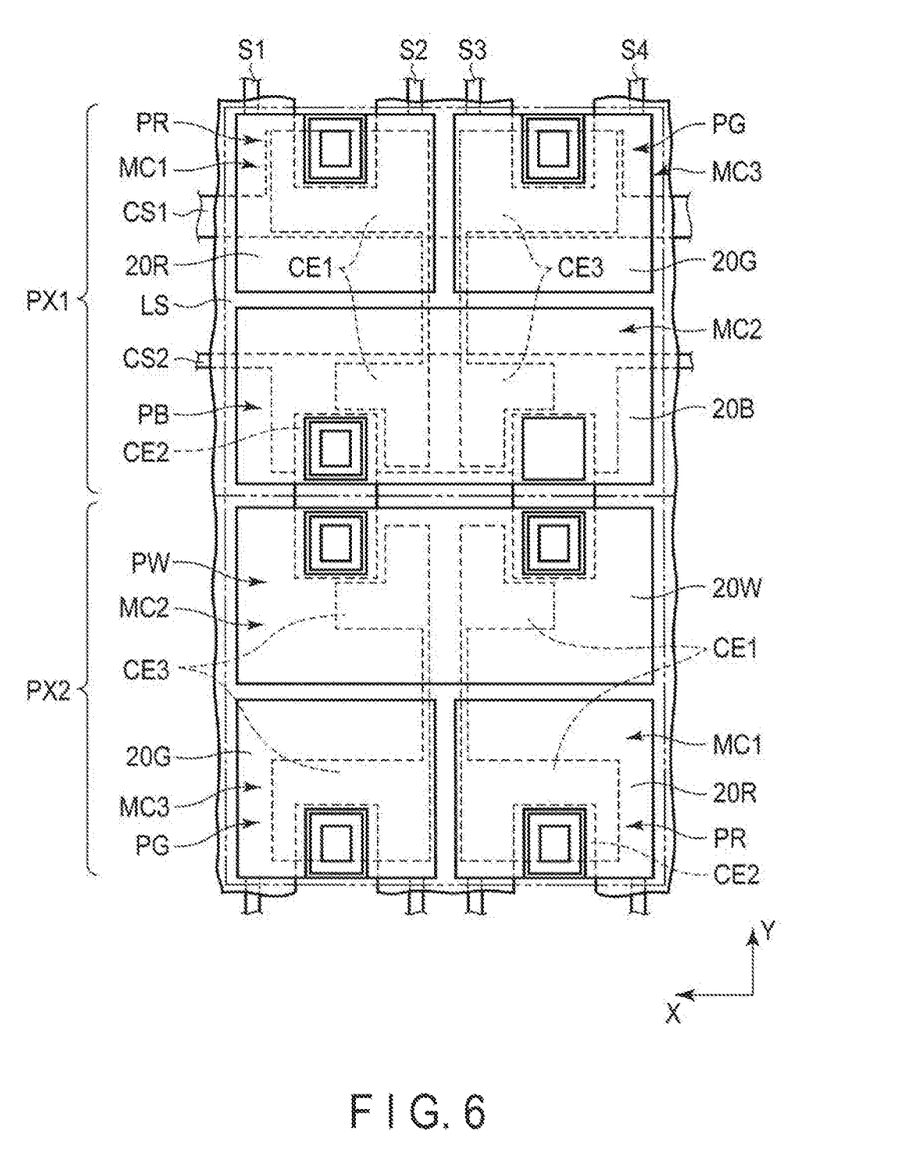
FIG. 6 is a plan view schematically showing a plurality of pixels on an array substrate in a liquid crystal display device according to a second embodiment.
Figure 7:
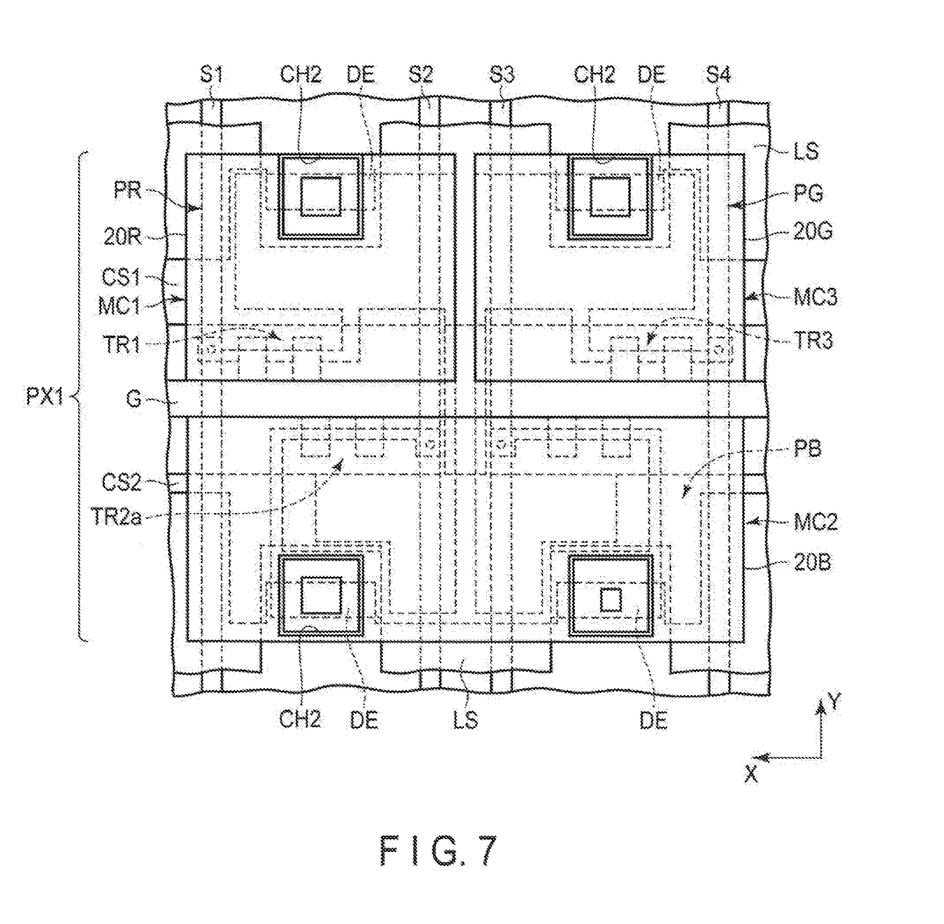
FIG. 7 is a plan view in which a pixel on the array substrate is enlarged.
Figure 8:
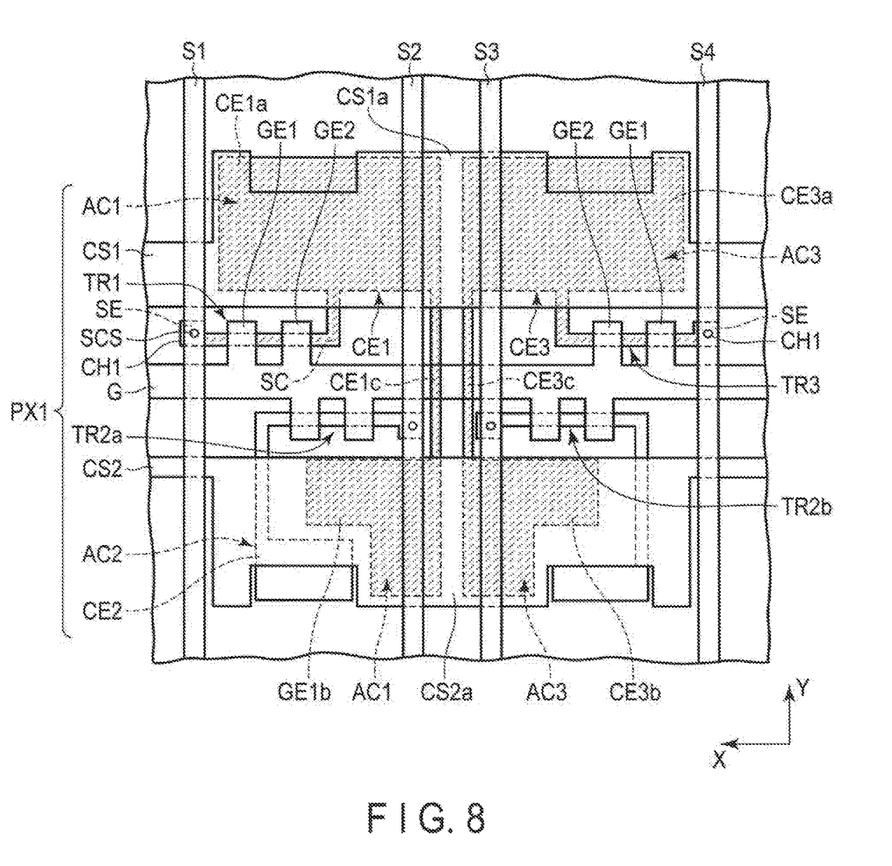
FIG. 8 is a plan view in which a pixel is enlarged in a state where pixel electrodes and a light-shielding layer are omitted according to the second embodiment.

FIG. 6 is a plan view schematically showing a plurality of pixels PX on an array substrate AR in a liquid crystal display device according to a second embodiment. FIG. 7 is a plan view in which a pixel is enlarged. FIG. 8 is a plan view in which a pixel is enlarged in a state where pixel electrodes and a light-shielding layer are omitted.

As shown in FIG. 6 and FIG. 7, a light-shielding layer LS is provided over substantially the entire surface of a display area DA of the array substrate AR. Pixels PX1 and PX2 on the array substrate AR are structured as, for example, square irregular-shaped pixels. The pixel PX1 comprises three rectangular pixel electrodes. The three pixel electrodes are a first pixel electrode (a pixel electrode for red) 20R, a second pixel electrode (a pixel electrode for blue) 20B and a third pixel electrode (a pixel electrode for green) 20G. The next pixel PX2 comprises three rectangular pixel electrodes. The three pixel electrodes are a first pixel electrode (a pixel electrode for red) 20R, a second pixel electrode (a pixel electrode for white) 20W and a third pixel electrode (a pixel electrode for green) 20G. The pixels PX1 and PX2 are alternately arranged.

The first pixel electrode 20R is substantially equal to the third pixel electrode 20G in size. The second pixel electrode 20B or 20W is several times as large as the first pixel electrode 20R in size, for example, approximately twice as large as the first pixel electrode 20R in size, and has a pixel area larger than that of the first pixel electrode 20R. In this manner, each of the pixels PX1 and PX2 comprises two small pixel electrodes 20R and 20G and one large pixel electrode 20B or 20W. The first pixel electrode 20R and the third pixel electrode 20G are arranged in a first direction (X-direction). The second pixel electrode 20B or 20W is arranged in a second direction (Y-direction) perpendicular to the first direction X with respect to the first and second pixel electrodes 20R and 20G.

The first, second and third pixel electrodes 20R, 20B (20W) and 20G face the light-shielding layer LS with an insulating layer interposed, and structure first, second and third main capacitances MC1, MC2 and MC3, respectively. The sizes of the first, second and third main capacitances MC1, MC2 and MC3 correspond to those of the first, second and third pixel electrodes 20R, 20B (20W) and 20G, respectively. Each of the pixels PX1 and PX2 comprises a first capacitance line CS1 extending in the first direction X under the first pixel electrode 20R and the third pixel electrode 20G, a second capacitance line CS2 extending in the first direction X under the second pixel electrode 20B (20W), and first, second and third capacitance electrodes CE1, CE2 and CE3.

As shown in FIG. 7 and FIG. 8, each pixel PX1 comprises four thin-film transistors. The four thin-film transistors are a thin-film transistor TR1 which drives the first pixel electrode 20R, two thin-film transistors TR2a and TR2b which drive the second pixel electrode 20B (or 20W), and a thin-film transistor TR3 which drives the third pixel electrode 20G. In the present embodiment, one of the thin-film transistors TR2a and TR2b, for example, the transistor TR2b, is provided as a dummy thin-film transistor.

Each thin-film transistor comprises a semiconductor layer SC provided on a first insulating layer, gate electrodes GE1 and GE2 provided on the semiconductor layer SC with a second insulating layer (gate insulating layer) interposed, and source and drain electrodes SE and DE provided on a third insulating layer covering the gate electrodes GE1 and GE2. Each thin-film transistor is a top-gate transistor.

In the present embodiment, the first capacitance electrode CE1 comprises a first electrode portion CE1a and a second electrode portion CE1b. The first and second electrode portions CE1a and CE1b are substantially rectangular and are continuously formed in the drain area of the thin-film transistor TR1. The first and second electrode portions CE1a and CE1b are connected to each other by a connecting portion CE1c and structure the first capacitance electrode CE1. The first electrode portion CE1a is provided at a position overlapping the first pixel electrode 20R. The second electrode portion CE1b is provided at a position overlapping the second pixel electrode 20B (20W). The first electrode portion CE1a is connected to the first pixel electrode 20R via the drain electrode DE.

The third capacitance electrode CE3 comprises a first electrode portion CE3a and a second electrode portion CE3b. The first and second electrode portions CE3a and CE3b are substantially rectangular and are continuously formed in the drain area of the thin-film transistor TR3. The first and second electrode portions CE3a and CE3b are connected to each other by a connecting portion CE3c and structure the third capacitance electrode CE3. The first electrode portion CE3a is provided at a position overlapping the third pixel electrode 20G. The second electrode portion CE3b is provided at a position overlapping the second pixel electrode 20B (20W). The first electrode portion CE3a is connected to the third pixel electrode 20G via the drain electrode DE.

The first and second electrode portions CE3a and CE3b of the third capacitance electrode CE3 are substantially equal to the first and second electrode portions CE1a and CE1b of the first capacitance electrode CE1 in size, respectively.

The second capacitance electrode CE2 is continuous with the drain area of the thin-film transistor TR2a, and is substantially rectangular. The second capacitance electrode CE2 is sufficiently smaller than the first capacitance electrode CE1 and the third capacitance electrode CE3.

The first and second capacitance lines CS1 and CS2 provided on the second insulating layer extend parallel to each other in the first direction X. In the first capacitance line SC1, a plurality of portions are wide, and structure capacitance electrodes SC1a, respectively. Each capacitance electrode SC1a is rectangular, having a size corresponding to the first electrode portion CE1a of the first capacitance electrode CE1 and the first electrode portion CE3a of the third capacitance electrode CE3. The capacitance electrode CS1a faces the first electrode portions CE1a and CE3a with the third insulating layer interposed. These capacitance electrodes form a first MIM auxiliary capacitance AC1 and a third MIM auxiliary capacitance AC3. The first and third auxiliary capacitances AC1 and AC3 are connected to the drains of the thin-film transistors TR1 and TR3, respectively.

In the second capacitance line CS2, a plurality of portions are wide, and structure capacitance electrodes CS2a, respectively. Each capacitance electrode CS2a is rectangular, and is located so as to overlap the second pixel electrode 20B (20W). Each capacitance electrode CS2a faces the second electrode portion CE1b of the first capacitance electrode CE1 and the second electrode portion CE3b of the third capacitance electrode CE3 with the third insulating layer interposed. These capacitance electrodes form the first MIM auxiliary capacitance AC1 and the third MIM auxiliary capacitance AC3.

In this manner, the first auxiliary capacitance AC1 is formed by the first and second electrode portions CE1a and CE1b of the capacitance electrode CE1, and the first and second capacitance lines CS1 and CS2. Similarly, the third auxiliary capacitance AC3 is formed by the first and second electrode portions CE3a and CE3b of the third capacitance electrode CE3, and the first and second capacitance lines CS1 and CS2.

The second capacitance electrode CE2 faces the capacitance electrode CS2a with the third insulating layer interposed. These capacitance electrodes form the third MIM auxiliary capacitance AC3. The second capacitance electrode CE2 is small. The third auxiliary capacitance AC3 is also sufficiently smaller than the first and second auxiliary capacitances AC1 and AC2. The drain areas of the thin-film transistors TR2a and TR2b hardly form storage capacitance and are connected to the second pixel electrode 20B (20W) via the drain electrodes DE.

As described above, the first capacitance electrode CE1 is substantially equal the third capacitance electrode CE3 in size. The first auxiliary capacitance AC1 has a capacitance substantially equal to that of the third auxiliary capacitance AC3. In this manner, the total capacitance of the first auxiliary capacitance AC1 and the first main capacitance MC1 formed of the first pixel electrode 20R having a small pixel area is set so as to be equal to the total capacitance of the second auxiliary capacitance AC2 and the third main capacitance MC3 formed of the third pixel electrode 20G similarly having a small pixel area. Moreover, the size of each electrode is set such that the total capacitance of the first main capacitance MC1 and the first auxiliary capacitance AC1 in the first pixel electrode 20R is equal to the total capacitance of the second main capacitance MC2 and the small second auxiliary capacitance AC2 in the second pixel electrode 20B (20W) having a large pixel area.

In this manner, even when the second pixel electrode 20B (20W) is set so as to be very large in size, specifically, so as to be twice as large as the first pixel electrode 20R in size, the capacitances connected to the drains of the thin-film transistors TR1, TR2 and TR3 can be the same as each other.

In the second embodiment, the other structures of the liquid crystal display device are the same as those of the first embodiment.

In the above second embodiment, the first to third pixel electrodes 20R, 20G and 20B (20W) included in each pixel PX have different shapes and sizes. The main capacitances MC1 to MC4 having different sizes are formed between the first to third pixel electrodes 20R, 20G and 20B (20W) and the light-shielding layer LS. By providing the MIM auxiliary capacitances AC1 and AC2, the variation in capacitances is eliminated. Thus, the capacitances are equalized. In this manner, it is possible to eliminate the variation in field-through voltages caused by a plurality of thin-film transistors TR and equalize the voltages. Thus, light leakage can be prevented. At the same time, the variation in the drive performance of the semiconductor elements can be removed. It is possible to obtain a liquid crystal display device having good display quality. Even when the pixel electrodes largely differ from each other in size, it is possible to form a storage capacitance using both the areas overlapping the small pixel electrodes and the areas overlapping the large pixel electrodes. Thus, the variation in the capacitances can be easily eliminated.

Third Embodiment

Figure 9:
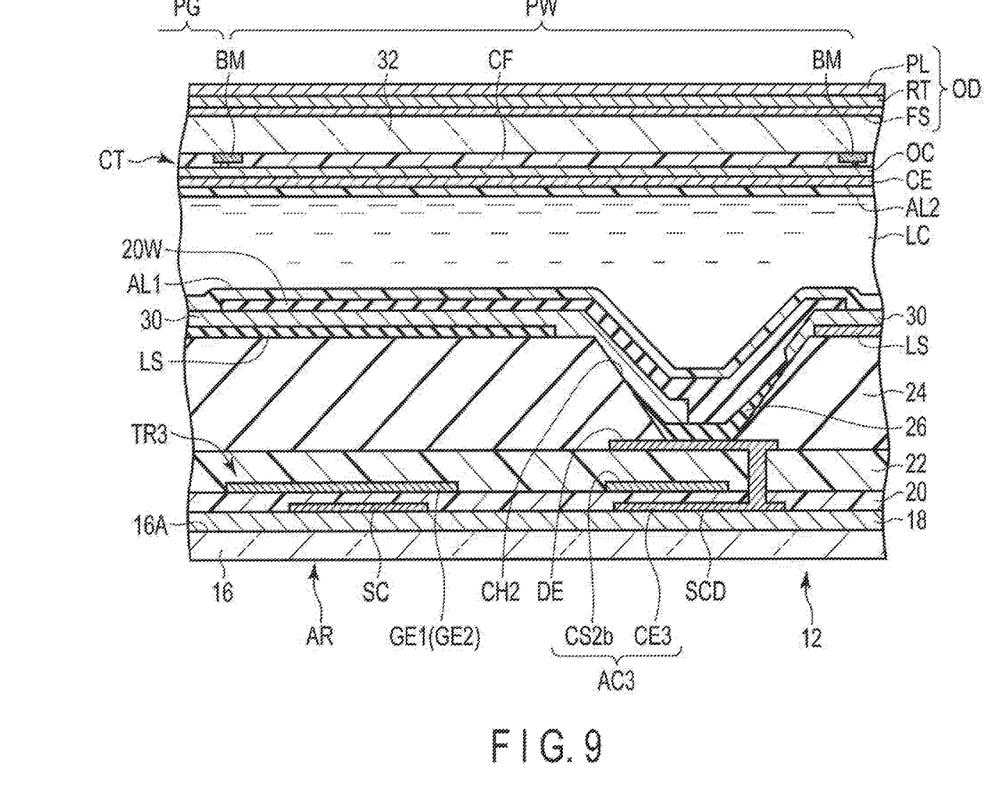
FIG. 9 is a cross-sectional view of a liquid crystal display panel in a liquid crystal display device according to a third embodiment.

FIG. 9 is a cross-sectional view showing an example of a liquid crystal display panel in a liquid crystal display device according to a third embodiment.

In the present embodiment, a pixel electrode 20W included in each pixel PX is formed of a transparent conductive material such as ITO. A light-shielding layer LS is formed of a light-shielding material which is conductive and photoreflective, such as aluminum or silver, and has a photoreflective function. In this manner, the external light which entered the liquid crystal display panel 12 transmits the pixel electrodes and enters the light-shielding layer LS. Subsequently, the light is reflected on the light-shielding layer LS.

A contact protective layer 26 provided in the bottom portion of each contact hole CH2 is formed of the same material as the light-shielding layer LS. Thus, it is possible to form the light-shielding layer LS and the contact protective layer 26 in the same process. The number of manufacturing processes can be reduced.

In the third embodiment, the other structures of the liquid crystal display device are the same as those of the first embodiment.

In the third embodiment, even when a pixel electrode is structured as a transparent electrode, external light is reflected on the light-shielding layer LS. Thus, a reflective-type liquid crystal display device can be realized. By conforming the material of the light-shielding layer to that of the contact protective layer, the manufacturing processes can be simplified. In addition, effects similar to those of the first embodiment can be obtained from the third embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures and manufacturing processes which can be implemented by a person of ordinary skill in the art through arbitrary design changes to the structures or processes described above as embodiments of the present invention come within the scope of the present invention as long as they are in keeping with the spirit of the present invention. In addition, other effects which can be obtained by the above embodiments and are self-evident from the description in this specification or can be arbitrarily conceived by a person of ordinary skill in the art are considered to be achievable by the present invention as a matter of course.

For example, the materials or shapes of the structural members are not limited to those described in the above embodiments, and may be selected in various ways.

What is claimed is:

1. A display device comprising:
   a first substrate comprising:
      a display area including a plurality of pixels;
      a plurality of signal lines;
      a plurality of capacitance lines; and
      a light-shielding layer which covers substantially an entire surface of the display area;
   a second substrate which faces the first substrate; and
   a liquid crystal layer provided between the first substrate and the second substrate, wherein
   each of the pixels comprises:
      a first pixel electrode which faces the light-shielding layer with an insulating layer interposed;
      a second pixel electrode which faces the light-shielding layer with the insulating layer interposed, and has a pixel area different from a pixel area of the first pixel electrode;
      a first semiconductor element connected to the signal lines and the first pixel electrode;

a second semiconductor element connected to the signal lines and the second pixel electrode;
a first capacitance electrode which is connected to the first semiconductor element, faces the capacitance lines with an insulating layer interposed, and forms a first auxiliary capacitance; and
a second capacitance electrode which is connected to the second semiconductor element, faces the capacitance lines with an insulating layer interposed, forms a second auxiliary capacitance, and has an electrode area different from an electrode area of the first capacitance electrode.

2. The display device of claim 1, wherein
the electrode areas of the first and second capacitance electrodes are set such that a total capacitance of the first auxiliary capacitance and a first main capacitance formed between the first pixel electrode and the light-shielding layer is substantially equal to a total capacitance of the second auxiliary capacitance and a second main capacitance formed between the second pixel electrode and the light-shielding layer.

3. The display device of claim 2, wherein
the first pixel electrode and the second pixel electrode include a reflective layer formed of a metal material having a photoreflective property.

4. The display device of claim 2, wherein
the light-shielding layer is formed by a photoreflective film, and
the first pixel electrode and the second pixel electrode are formed by transparent electrodes.

5. The display device of claim 4, wherein
the first and second semiconductor elements comprise a drain electrode connected to the first or second pixel electrode, and
a contact protective layer is provided between the drain electrode and the first and second pixel electrodes.

6. The display device of claim 5, wherein
the contact protective layer is formed of a photoreflective material in common with the light-shielding layer.

7. The display device of claim 6, wherein
each of the pixels further comprises:
a third pixel electrode having a pixel area in common with the second pixel electrode;
a fourth pixel electrode having a pixel area in common with the first pixel electrode;
a third semiconductor element connected to the signal lines and the third pixel electrode; and
a fourth semiconductor element connected to the signal lines and the fourth pixel electrode.

8. The display device of claim 7, wherein
each of the pixels further comprises:
a third capacitance electrode which is connected to the third semiconductor element, faces the capacitance lines with an insulating layer interposed, and forms a third auxiliary capacitance; and
a fourth capacitance electrode which is connected to the fourth semiconductor element, faces the capacitance lines with an insulating layer interposed, and forms a fourth auxiliary capacitance,
the fourth capacitance electrode has an electrode area in common with the electrode area of the first capacitance electrode, and
the second capacitance electrode has the electrode area in common with an electrode area of the third capacitance electrode.

9. The display device of claim 6, wherein
each of the pixels further comprises:
a third pixel electrode having a pixel area in common with the first pixel electrode;
a third semiconductor element connected to the signal lines and the third pixel electrode; and
a third capacitance electrode which is connected to the third semiconductor element, faces the capacitance lines with an insulating layer interposed, and forms a third auxiliary capacitance, and
the second pixel electrode has a pixel area several times as large as a pixel area of the first pixel electrode.

10. The display device of claim 9, wherein
the first capacitance electrode comprises:
a first electrode portion overlapping the first pixel electrode; and
a second electrode portion overlapping the second pixel electrode and connected to the first electrode portion, and
the third capacitance electrode comprises:
a first electrode portion overlapping the third pixel electrode; and
a second electrode portion overlapping the second pixel electrode and connected to the first electrode portion.

11. The display device of claim 1, wherein
the first pixel electrode and the second pixel electrode include a reflective layer formed of a metal material having a photoreflective property.

12. The display device of claim 1, wherein
the light-shielding layer is formed by a photoreflective film, and
the first pixel electrode and the second pixel electrode are formed by transparent electrodes.

13. The display device of claim 1, wherein
each of the pixels further comprises:
a third pixel electrode having a pixel area in common with the second pixel electrode;
a fourth pixel electrode having a pixel area in common with the first pixel electrode;
a third semiconductor element connected to the signal lines and the third pixel electrode; and
a fourth semiconductor element connected to the signal lines and the fourth pixel electrode.

14. The display device of claim 13, wherein
each of the pixels further comprises:
a third capacitance electrode which is connected the third semiconductor element, faces the capacitance lines with an insulating layer interposed, and forms a third auxiliary capacitance; and
a fourth capacitance electrode which is connected to the fourth semiconductor element, faces the capacitance lines with an insulating layer interposed, and forms a fourth auxiliary capacitance,
the fourth capacitance electrode has an electrode area in common with the electrode area of the first capacitance electrode, and
the second capacitance electrode has the electrode area in common with an electrode area of the third capacitance electrode.

15. The display device of claim 1, wherein
each of the pixels further comprises:
a third pixel electrode having a pixel area in common with the first pixel electrode;
a third semiconductor element connected to the signal lines and the third pixel electrode; and
a third capacitance electrode which is connected to the third semiconductor element, faces the capacitance lines with an insulating layer interposed, and forms a third auxiliary capacitance, and the second pixel electrode has a pixel area several times as large as a pixel area of the first pixel electrode.

16. The display device of claim 15, wherein
the first capacitance electrode comprises:
- a first electrode portion overlapping the first pixel electrode; and
- a second electrode portion overlapping the second pixel electrode and connected to the first electrode portion, and the third capacitance electrode comprises:
- a first electrode portion overlapping the third pixel electrode; and
- a second electrode portion overlapping the second pixel electrode and connected to the first electrode portion.

17. A display device comprising:
an array substrate comprising:
- a display area including a plurality of pixels; and
- a light-shielding layer covering the display area;
a counter-substrate comprising a counter-electrode facing the display area;
a liquid crystal layer provided between the array substrate and the counter-substrate; and
a light-shielding layer covering the display area, wherein each of the pixels comprises:
- at least two types of pixel electrodes which have different sizes, face the light-shielding layer with an insulating layer interposed, and structure main capacitances, respectively;
- a plurality of switching elements connected to the pixel electrodes, respectively; and
- at least two types of auxiliary capacitances which have different sizes and are connected to the switching elements, respectively, and
a sum of the main capacitance and the auxiliary capacitance in each pixel electrode is the same among the at least two types of pixel electrodes.

18. The display device of claim 17, wherein
a photoreflective layer is provided in the pixel electrodes or the light-shielding layer.

* * * * *